Patented Apr. 4, 1944

2,345,960

UNITED STATES PATENT OFFICE 2,345,960

PROCESS FOR REFINING AND STABILIZING FAT-SOLUBLE VITAMIN-BEARING MATERIALS

Loran O. Buxton, Belleville, N. J., assignor to National Oil Products Company, Harrison, N. J., a corporation of New Jersey No Drawing. Application June 18, 1941, Serial No. 398,594

11 Claims. (Cl. 167—81)

This invention relates to the refining and stabilization of fat-soluble vitamin-containing materials, more particularly to the removal of undesirable tastes and odors from fat-soluble vitamin-containing oils and concentrates, and to the stabilization of said vitamin-containing materials against oxidative changes.

As is well known, fish liver oils are an excellent source of both vitamins A and D; moreover, saponification of fish liver oils and extraction of the unsaponifiable material therefrom yields fat-soluble vitamin concentrates which have found a wide variety of uses. While such products are eminently satisfactory for many purposes, they generally possess the undesirable taste and odor normally associated with products of fish origin. Fat-soluble vitamin-containing materials derived from sources other than of a fish origin also may possess undesirable tastes and odors. Many attempts have been made in an endeavor to improve the taste and odor of fat-soluble vitamin-containing materials objectionable in these respects. For example, an alkali refining method has been employed for improving the tastes and odors of vitamin oils; in this method an alkali soap is prepared in the presence of the oil and then removed, the soap tending to carry with it some of the objectionable taste and odor. However, this method possesses many disadvantages, among them being that the oil becomes less stable when treated in this manner; furthermore, the odor and taste of the oil are not improved as much as might be desired. Another method commonly employed for improving the taste and odor of vitamin oils and concentrates involves passing steam through the heated oil or concentrate at a reduced pressure; while this method effects some deodorization, the deodorization is in most cases merely temporary, and, furthermore, this process removes only objectionable constituents of a volatile nature.

It is an object of this invention to provide fat-soluble vitamin-containing materials having no undesirable tastes or odors.

It is another object of this invention to provide a process for improving the taste and odor of fat-soluble vitamin-containing materials having objectionable tastes and odors.

It is also the object of this invention to provide fat-soluble vitamin-containing materials which have no undesirable tastes or odors and are also relatively stable to oxidative changes.

In my copending application Serial No. 351,909, filed August 8, 1940, a process is disclosed and claimed whereby the antioxidant principles of a vegetable oil containing natural antioxidants may be concentrated many fold by treating the oil with a solvent such as isopropanol at room temperature or at temperatures above room temperature, cooling the mixture to a temperature within the range of 0° C. to —70° C., and separating from the oil the isopropanol fraction which is immiscible with the oil at the lower temperature. The major portion of the antioxidant principles of the original oil is concentrated in the residue which remains on evaporation of the isopropanol from the isopropanol soluble fraction.

In my copending application Serial No. 397,547, filed June 11, 1941, a process is disclosed and claimed whereby the antioxidant principles of an oil-bearing plant material containing natural antioxidants may be separated from said material and concentrated many fold by means of a process similar to that of my copending application Serial No. 351,909.

I have found that the undesirable tastes and odors of fat-soluble vitamin-bearing materials objectionable in these respects may be substantially completely removed by heating such fat-soluble vitamin-containing materials at a temperature between about 60° C. and about 200° C. with an antioxidant fraction prepared in accordance with the process of application Serial No. 351,909, as described hereinabove, from a vegetable oil containing natural antioxidants, or with an antioxidant fraction prepared in accordance with the process of application Serial No. 397,547, as described hereinabove, from an oil-bearing plant material containing natural antioxidants.

In addition to removing the undesirable tastes and odors, the vitamin-containing material which is treated is also rendered more stable to oxidative changes. A fat-soluble vitamin-containing material may be treated in accordance with the process of my invention by mixing the material with an antioxidant fraction prepared in accordance with either of the processes referred to above, and heating the mixture at a temperature between about 60° C. and about 200° C. in an open vessel. Preferably, however, the mixture is heated at the desired temperature under a reduced pressure in an inert gas atmosphere in order to minimize destruction of the vitamins and to assist in the removal of the odoriferous substances. It will be found in every case that the resulting products possess substantially no undesirable tastes or odors, and hence are eminently suitable for practically all purposes, particularly for human consumption; and moreover, the vitamin potencies of the materials refined are not materially affected by the refining process. Also, the vitamin-bearing material is protected against oxidative changes by the natural antioxidants which are added to said material by the addition of the antioxidant fraction.

Any fat-soluble vitamin-containing material having an undesirable taste and odor may be treated in accordance with my invention; thus materials containing vitamins A, D, E or K, such as, for example, cod liver oil, halibut liver oil, sword fish liver oil, tuna liver oil, shark liver oil, whale liver oil, porpoise liver oil, seal liver oil and similar oils may be treated, as well as fat-soluble vitamin concentrates obtained, for example, by saponification of a vitamin-containing oil and extraction of the unsaponifiable material. The process of my invention is particularly applicable to the refining of vitamin A and/or D containing oils or vitamin A and/or D concentrates of fish origin, since treatment of such materials in accordance with my invention produces products far superior to any of those now on the market. The vitamin-containing materials to be treated in accordance with my invention should not contain any foreign metals, since the presence of such metals usually accelerates deterioration of the vitamin A or D content of the oil or concentrate at the elevated temperatures employed.

The materials from which the antioxidants which are used in the process of my invention are extracted in accordance with the process of copending application Serial No. 351,909 may be any fatty material containing naturally-occurring antioxidants, or mixtures thereof; preferably crude materials containing such antioxidants are employed. The term "fatty material" is used herein to include oils, fats and waxes containing fatty acid radicals. There are many such materials containing natural antioxidants known to the art. Thus vegetable oils and fats, such as soybean oil, wheat bran oil, wheat germ oil, corn germ oil, corn oil, oat oil, rye oil, olive oil, sesame oil, cottonseed oil, palm oil, cocoa butter, palm kernel oil, coconut oil, rice oil, rice germ oil, linseed oil, oiticia oil, teaseed oil, perilla oil, alfalfa seed oil, celery seed oil, hemp seed oil, kapok oil, mustard seed oil, rape seed oil, poppy seed oil, sunflower seed oil, pumpkin seed oil, melon seed oil, peanut oil and the like may be treated.

Also one may prepare antioxidant fractions to be used in the process of my invention by treating an oil-bearing plant material containing natural antioxidants in accordance with the process of my copending application Serial No. 397,547. For example, one may prepare fractions containing natural antioxidants by treating soybeans, wheat bran, wheat germ, corn germ, corn grain, oats, rye, sesame seed, cotton seed, palm kernels, cocoa bean, copra, rice, rice germ, flax seed, hemp seed, tea seed, perilla seed, mustard seed, rape seed, poppy seed, sunflower seed, pumpkin seed, melon seed, peanuts, celery seed, alfalfa seed, tomato seed, or any other oil-bearing plant material containing natural antioxidants.

As set forth in the copending applications Serial Nos. 351,909 and 397,547 above referred to, antioxidant fractions are obtained by contacting vegetable oils or oil bearing plant material with a suitable solvent such as isopropanol at temperatures above room temperature, separating the solvent from the material insoluble therein, and thereafter removing the extracted natural antioxidant concentrate from the solvent. As also set out in the patent applications above referred to, there may be employed instead of the isopropanol, any of the solvents coming within the classes set forth in the table to follow:

TABLE

1. Aliphatic and alicyclic monohydroxy alcohols containing from 3 to 6 carbon atoms.
2. Esters formed by the reaction of aliphatic and alicyclic alcohols with aliphatic monocarboxylic acids, said esters containing not more than 8 carbon atoms.
3. Aliphatic and alicyclic aldehydes containing not more than 6 carbon atoms.
4. Aliphatic ketones containing not more than 6 carbon atoms.

It will be noted that these preferred solvents are all liquid organic compounds having the properties of being substantially miscible with fatty oils at temperatures substantially below room temperature; experiments in this connection have shown that solvents of this class may be used generally in the process hereinabove described.

In carrying out the process of my invention a fat-soluble vitamin-containing material having an objectionable taste and odor may be mixed with a suitable amount of an antioxidant fraction and the mixture heated to a temperature between about 60° C. and about 200° C. The amount of antioxidant fraction to be used will depend upon the particular antioxidant fraction employed and to some extent upon the taste and odor of the vitamin-bearing material which is to be refined. Generally it may be said that an amount of antioxidant fraction between about 0.5% and about 10% of the weight of the vitamin-bearing material may suitably be used. The temperature at which the mixture is heated is particularly important, since I have found that at temperatures below about 60° C. the undesirable taste and odor are not substantially completely removed from the fat-soluble vitamin-containing material; and at temperatures above about 200° C. deterioration of the vitamins is apt to occur, particularly if a vitamin A-containing material is being treated. In most cases if the mixture is heated above about 130° C. a slight darkening of the oil is likely to occur which is possibly caused by the decomposition of phosphatides that may be present in the antioxidant fraction. Oftentimes, this darkening is unobjectionable, and when such is the case, I prefer to heat the mixture at a temperature between about 160° C. and about 180° C. However, when it is desired to obtain a deodorized, stabilized oil having substantially the same color as the original oil, I prefer to heat the mixture at a temperature between about 100° C. and about 130° C. Usually the heating period required to obtain the desired results when the heating is carried out at the higher temperatures will be shorter than when the heating is done at the lower temperatures. Just as efficient results may be obtained, however, by heating the mixture at temperatures even as low as about 60° C., provided the mixture is heated for a somewhat longer period of time. If it is desired to heat the mixture at temperatures above about 130° C. without having the color of the oil darkened to any material extent, the antioxidant fraction may be treated to remove any phosphatides that may be present before the fraction is added to the oil which is to be treated. The phosphatides may be substantially completely removed from the antioxidant fraction by dissolving the fraction in acetone, cooling the acetone solution to about —20° C. and removing the fraction insoluble at that temperature. When the oil is heated with an antioxidant fraction which has been so treated, the color of the oil will remain substantially unchanged even when the mixture is heated to temperatures as high as 200° C.

The heating may be conducted in an open vessel if desired; however, in order to avoid the danger of deterioration of the vitamin A content of the materials treated in accordance with my invention, the heating step is preferably carried out in the presence of an inert gas such as nitrogen or carbon dioxide. Furthermore, I have found it desirable to heat the mixture at reduced pressures, preferably at pressures below about 20 mm. since under these conditions removal of the odoriferous constituents of the oil or concentrate is accelerated. The time of heating may vary to some extent; generally between about two minutes and about one hour, e. g. between about 5 minutes and about 15 minutes, is sufficient.

In some cases, as noted hereinabove, it may be found that the process of my invention, while it substantially improves the odor and taste of the fat-soluble vitamin-containing materials, also imparts thereto a color somewhat darker than that possessed by the original material. This color may be easily removed by contacting the refined vitamin-containing material with a decolorizing agent such as decolorizing carbon, whereby a light-colored product substantially free from undesirable tastes and odors is obtained. If desired, the fat-soluble vitamin-containing materials may be decolorized by contact with decolorizing carbon prior to the refining process of my invention. The decolorizing treatments are preferably carried out by mixing the vitamin-containing material with a deaerated mixture of decolorizing carbon and a solvent for the material and agitating the mass in the absence of air; this process is described and claimed in my copending application Serial No. 227,599, filed August 30, 1938, which issued Dec. 29, 1942 as Patent No. 2,306,776.

The refined products of my invention possess very little, if any, of the objectionable taste and odor characteristic of the materials from which they are obtained; hence these products are eminently suitable for a variety of purposes and find particular application in the preparation of vitamin products for human consumption. Furthermore, extensive tests have indicated that the products of my invention have substantially lower peroxide numbers than those of the original vitamin-containing materials; this factor is of great importance since vitamin-containing materials having low peroxide numbers are much more stable than those having high peroxide numbers. Also the vitamin-bearing material is protected against oxidative changes by the natural antioxidants which are added to said material by the addition of the antioxidant fraction. Thus it will be evident that my invention not only improves the taste and odor of the fat-soluble vitamin-containing materials, but also improves their stability.

For a full understanding of the nature and objects of the invention, reference should be had to the following examples which are given merely to further illustrate the invention and are not to be construed in a limiting sense, all parts given being by weight.

EXAMPLE I 5 parts of an antioxidant fraction obtained by treating crude wheat germ oil with isopropanol were added to 95 parts of shark liver oil having a fishy taste and odor. The mixture was heated at 125° C. for 5 minutes under reduced pressure in the presence of nitrogen gas. A completely odorless, bland product having the same vitamin potency and substantially the same color as the untreated material was obtained.

EXAMPLE II

A shark liver oil having a fishy taste and odor was treated as in Example I except that it was heated at 100° C. instead of at 125° C. The resulting product was odorless and had a pleasant taste, and the vitamin potency and color were unchanged.

EXAMPLE III

A substantially phosphatide-free antioxidant fraction was prepared from crude corn germ oil by treating said oil with isopropanol as described hereinabove, adding the fraction obtained by the isopropanol treatment to sufficient acetone to produce a 10% solution, cooling the acetone solution to about —18° C., and removing the fraction insoluble at that temperature. The residue obtained on removing the actone from the acetone-soluble fraction was a highly active antioxidant material substantially free of phosphatides.

5 parts of this substantially phosphatide-free fraction were added to 95 parts of shark liver oil having a fishy taste and odor, and the mixture heated to a temperature of about 170° C. under reduced pressure in the presence of nitrogen gas. The resulting product was devoid of fishiness, the vitamin potency of the oil was unchanged, and the color of the oil was substantially the same as that of the original material.

EXAMPLE IV

A shark liver oil having a fishy taste and odor was treated as in Example III except that the substantially phosphatide-free antioxidant fraction was prepared from crude soybean oil instead of from crude corn germ oil. The resulting product was odorless and had a pleasant taste, and the vitamin potency and color were unchanged.

The relative stability of the untreated oils and of the treated oils was determined by carrying out stability tests under accelerated conditions. In these tests the oils were maintained at a constant temperature of 34.5° C. in the presence of air for a number of days and the percentage of vitamin A destroyed then determined. The results of these tests are given in Table I.

*Table I*

| Sample | Percent vitamin A destroyed in— | | |
|---|---|---|---|
| | 6 days | 14 days | 27 days |
| A sample of the untreated oil used for Examples I and II | 5.8 | 47.4 | |
| The treated oil of Example I | 0.0 | | 22.3 |
| The treated oil of Example II | 0.0 | | 23.5 |
| A sample of the untreated oil used for Examples III and IV | 34.0 | 76.6 | |
| The treated oil of Example III | 1.4 | 19.2 | |
| The treated oil of Example IV | 0.5 | 22.4 | |

It will be evident from the above description that my invention provides a new and effective method of preparing substantially odorless and tasteless fat-soluble vitamin-containing materials relatively stable to oxidative changes from fat-soluble vitamin-containing materials having objectionable tastes and odors. My invention will, therefore, be of great interest to those engaged in the preparation of vitamin compositions, particularly for human and animal consumption. Furthermore, while my invention is primarily directed to the refining of fat-soluble vitamin-containing materials, it is also applicable to the refining of any edible oil or fat having an objectionable taste and odor.

Since certain changes in carrying out the above process and certain modifications in the compositions which embody the invention may be made without departing from its scope, it is intended that all matter contained in the above description shall be interpreted as illustrative and not in a limiting sense.

This application is a continuation-in-part of my copending applications Serial No. 351,909, filed August 8, 1940, and Serial No. 397,547, filed June 11, 1941.

Having described my invention, what I claim as new and desire to secure by Letters Patent, is:

1. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to $-70°$ C. whereby layers are formed, separating the solvent layer from the insoluble residue, and removing the extracted natural antioxidant concentrate from the solvent; heating the mixture under reduced pressure at a temperature between about 60° C. and about 200° C. for a period of time sufficient to remove the objectionable tastes and odors from said vitamin-containing material.

2. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to $-70°$ C. whereby layers are formed, separating the solvent layer from the insoluble residue, and removing the extracted natural antioxidant concentrate from the solvent; heating the mixture in an inert gas atmosphere under reduced pressure at a temperature between about 60° C. and about 200° C. for a period of time sufficient to remove the objectionable tastes and odors from said vitamin-containing material.

3. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to $-70°$ C. whereby layers are formed, separating the solvent layer from the insoluble residue, and removing the extracted natural antioxidant concentrate from the solvent; heating the mixture under reduced pressure at a temperature between about 100° C. and about 130° C. for a period of time sufficient to remove the objectionable tastes and odors from said vitamin-containing material.

4. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing material selected from the group consisting of vegetable oils and vegetable oil-bearing solids, at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to $-70°$ C. whereby layers are formed, separating the solvent layer from the insoluble residue, and removing the extracted natural antioxidant concentrate from the solvent; heating the mixture in an inert gas atmosphere under reduced pressure at a temperature between about 100° C. and about 130° C. for a period of time sufficient to remove the objectionable tastes and odors from said vitamin-containing material.

5. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing material selected from the group consisting of vegetable oils and vegetable oil-bearing solids, at a temperature above room temperature with isopropanol, cooling the mass to a temperature within the range of 0° C. to —70° C. whereby layers are formed, separating the isopropanol layer from the insoluble residue, and removing the extracted natural antioxidant concentrate from the isopropanol; heating the mixture under reduced pressure at a temperature between about 60° C. and about 200° C. for a period of time sufficient to remove the objectionable tastes and odors from said vitamin-containing material.

6. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing wheat germ oil, at a temperature above room temperature with a solvent selected from the group consisting of aliphatic and alicyclic monohyroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residue, and removing the extracted natural antioxidant concentrate from the solvent; heating the mixture under reduced pressure at a temperature between about 60° C. and about 200° C. for a period of time sufficient to remove the objectionable tastes and odors from said vitamin-containing material.

7. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing corn germ oil, at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residue, and removing the extracted natural antioxidant concentrate from the solvent; heating the mixture under reduced pressure at a temperature between about 60° C. and about 200° C. for a period of time sufficient to remove the objectionable tastes and odors from said vitamin-containing material.

8. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing soybean oil, at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to —70° C. whereby layers are formed, separating the solvent layer from the insoluble residue, and removing the extracted natural antioxidant concentrate from the solvent; heating the mixture under reduced pressure at a temperature between about 60° C. and about 200° C. for a period of time sufficient to remove the objectionable tastes and odors from said vitamin-containing material.

9. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing wheat germ oil, at a temperature above room temperature with isopropanol, cooling the mass to a temperature within the range of 0° C. to —70° C. whereby layers are formed, separating the solvent layer from the insoluble residue, and removing the extracted natural antioxidant concentrate from the solvent; heating the mixture under reduced pressure at a temperature between about 100° C. and about 130° C. for a period of time sufficient to remove the objectionable tastes and odors from said vitamin-containing material.

10. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing corn germ oil, at a temperature above room temperature with isopropanol, cooling the mass to a temperature within the range of 0° C. to —70° C. whereby layers are formed, separating the solvent layer from the insoluble residue, and removing the extracted natural antioxidant concentrate from the solvent; heating the mixture under reduced pressure at a temperature between about 100° C. and about 130° C. for a period of time sufficient to remove the objectionable tastes and odors from said vitamin-containing material.

11. A process of removing objectionable tastes and odors from fat-soluble vitamin-containing materials and for protecting said material against oxidative changes, which comprises mixing a fat-soluble vitamin-containing material selected from the group consisting of fish oils, fish liver oils and concentrates thereof with a natural antioxidant concentrate prepared by contacting a natural antioxidant-containing soybean oil, at a temperature above room temperature with isopropanol, cooling the mass to a temperature within the range of 0° C. to −70° C. whereby layers are formed, separating the solvent layer from the insoluble residue, and removing the extracted natural antioxidant concentrate from the solvent; heating the mixture under reduced pressure at a temperature between about 100° C. and about 130° C. for a period of time sufficient to remove the objectionable tastes and odors from said vitamin-containing material.

LORAN O. BUXTON.